Figure 1:
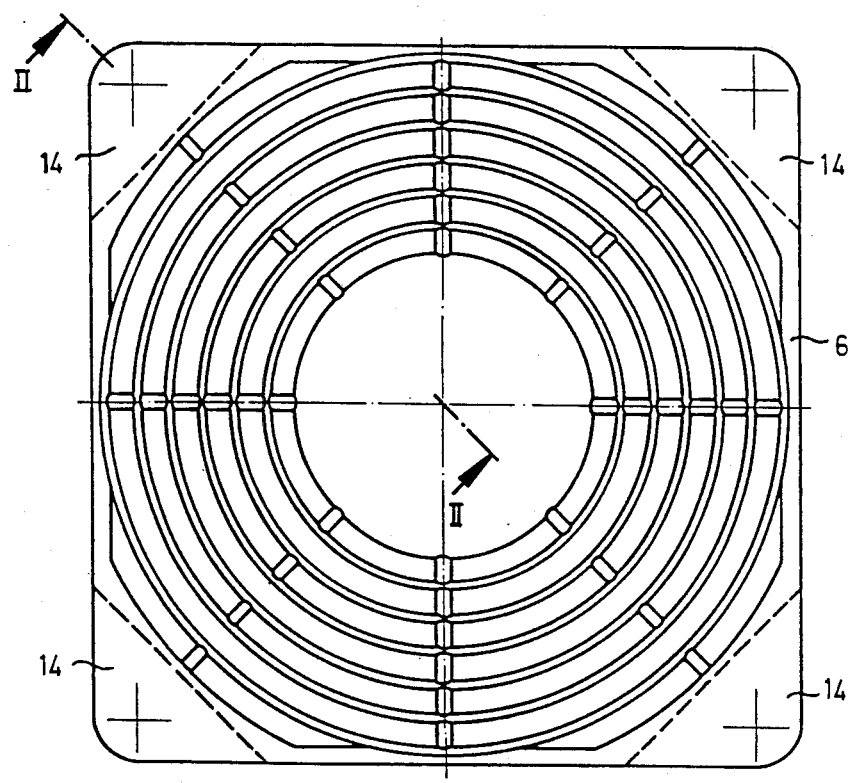

United States Patent [19]

Sturm et al.

[11] Patent Number: 4,724,747
[45] Date of Patent: Feb. 16, 1988

[54] VENTILATOR HOUSING WITH A PROTECTIVE SCREEN

[75] Inventors: Gerhard Sturm, Mulfingen; Horst Voss; Jürgen Zilling, both of Kunzelsau, all of Fed. Rep. of Germany

[73] Assignee: ebm Elektrobau Mulfingen GmbH & Co., Fed. Rep. of Germany

[21] Appl. No.: 860,474

[22] Filed: May 7, 1986

[30] Foreign Application Priority Data

Dec. 21, 1985 [DE] Fed. Rep. of Germany ....... 3545680

[51] Int. Cl.⁴ .............................................. F24F 7/00
[52] U.S. Cl. .......................................... 98/1; 411/510; 415/121 G; 416/247 R
[58] Field of Search ................... 98/94.1, 121.1, 1; 248/231.9, 672; 411/508, 509, 510; 415/121 G; 416/247 R

[56] References Cited

U.S. PATENT DOCUMENTS

| | | | |
|---|---|---|---|
| 2,601,947 | 7/1952 | Buttner | 415/121 G X |
| 3,278,114 | 10/1966 | Gibbs | 415/121 G X |
| 3,383,700 | 5/1968 | Taylor | 415/121 G X |
| 4,214,505 | 7/1980 | Aimar | 411/510 X |
| 4,318,208 | 3/1982 | Borja et al. | 411/508 X |
| 4,551,189 | 11/1985 | Peterson | 411/510 X |
| 4,568,215 | 2/1986 | Nelson | 411/510 X |

FOREIGN PATENT DOCUMENTS

| | | | |
|---|---|---|---|
| 1020694 | 2/1966 | United Kingdom | 411/510 |
| 1442508 | 7/1976 | United Kingdom | 411/510 |
| 2077845 | 12/1981 | United Kingdom | 411/510 |

Primary Examiner—Harold Joyce
Attorney, Agent, or Firm—Goodman & Teitelbaum

[57] ABSTRACT

A ventilator housing with at least one protective screen for covering a ventilator positioned in a housing, whereby through-hole borings for fastening the protective screen with fastening elements are provided in the walls of the housing. The fastening elements are formed as pin-shaped fastening studs, which can be inserted into the through-hole borings of the housing walls, and which have, on their peripheral surfaces, tongue-like springy counter-hooks which are directed in the direction opposed to the direction of insertion of the stud, being angularly to the longitudinal axis of the stud, so that after insertion of the studs into the borings, at least one counter-hook engages the housing wall under prestressing.

15 Claims, 8 Drawing Figures

VENTILATOR HOUSING WITH A PROTECTIVE SCREEN

The invention concerns a ventilator housing with at least one protective screen for covering a ventilator positioned in the housing, whereby through-hole borings are provided in the walls of the housing, in order to secure the protective screen by means of fastening elements.

Such ventilator housings particularly serve to accommodate axial ventilators and are formed as wall rings, in which a through-hole aperture of the ventilator is positioned. For a bilateral axial covering of the ventilator, protective screens are usually attached by means of screws which extend into the borings of the housings. The screws can be formed as threaded screws or as self-tapping screws, with or without nuts. Furthermore, for fastening the protective screen, so-called fastening spring nuts can be used, which consist of a plate bent in a U-shape, the blades of which have through-hole bores, and which are adjusted in their distances from one another corresponding to the strength of the housing wall. The fastening spring nuts are provided with borings at positions in the border area of the wall rings, which, under the intermediate position of the protective screen, are attached by means of suitable self-tapping screws. Furthermore, U-shaped assembly clips are known which are pushed to the side of the housing boring which is turned away from the protective screen, over bars which project out laterally from the housing wall. From the forward side of the protective screen, the attachment occurs by means of screws which engage with the threading of the assembly clips. All such screw fasteners have the disadvantage that assembly is complicated and time-consuming. Furthermore, screw connections can, because of the vibrations produced by the ventilator, loosen, which can lead to the development of disturbing rattling noises in the protective screen.

The task which serves as the basis of the invention is thus that of citing a ventilator housing of the type described above, the protective screen of which can be attached simply, rapidly, and yet securely, so that the development of noise caused by vibrations in the protective screen can be avoided.

In accordance with the invention, this was obtained through the fact that the fastening elements are formed as pin-shaped fastening studs, which can be inserted into the through-hole borings of the housing walls, and which have tongue-like springy counter-hooks on their peripheral surfaces, which are directed in the direction opposed to the direction of insertion of the stud, and angularly to the longitudinal axis of the stud, at least one counter-hook of which engages the counter-wall under prestressing after the insertion of the studs into the borings. The assembly of the protective screen is considerably simplified by this advantageous development, since no screw connections consisting of many individual parts are used any longer, but only the fastening studs in accordance with the invention need be inserted into the borings in the housing. Through the springiness of the counter-hooks, these ensure prestressing between the housing and the protective screens, so that vibrations in the ventilator can not lead to the loosening of the protective screen and thus to the development of noise. Moreover, the use of fastening studs in accordance with the invention with counter-hooks has the advantage that the permissible tolerance range for the diameter of the housing through-hole borings is greater, so that, proceding from a minimal permissible boring diameter, a tolerance range of about +0.6 mm is permissible. Furthermore, on the basis of the studs in accordance with the invention, the fastening of the protective screen is independent of the strength of the housing walls. In a particularly advantageous form of execution of the invention, the studs are formed in one piece with the protective screens, so that no separate connecting elements, which always run the risk of being lost, are needed any longer. Alternately to this, it lies within the framework of the invention to develop the studs with a head and a shaft, so that they engage the shaft and through-hole borings of the protective screen. Further advantageous characteristic developments of the invention are contained in the following description.

Figures 2A, 2B:
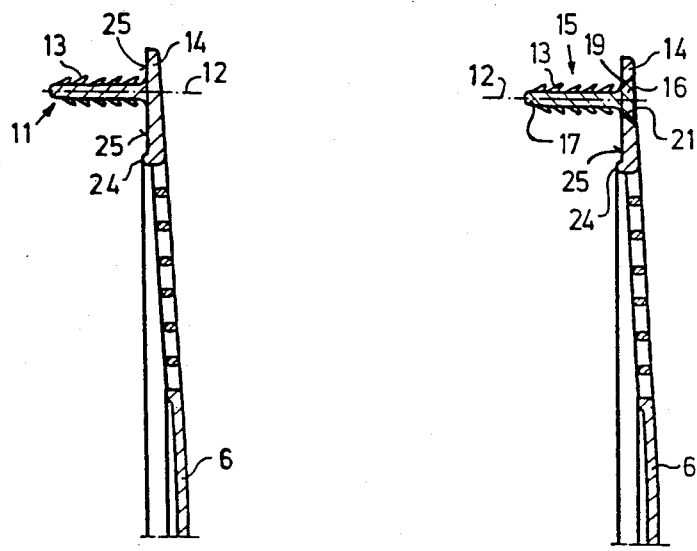
Figure 3:
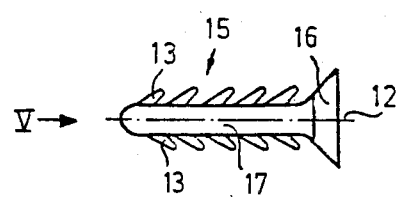
Figure 4:
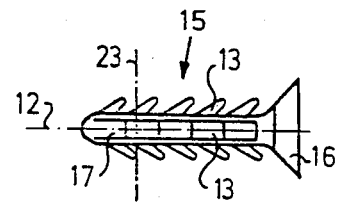
Figure 5A:
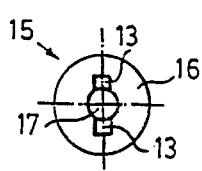
Figure 5B:
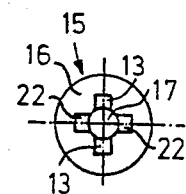

The invention will be described in greater detail by the examples of execution depicted in the drawings. These show:

FIG. 1: a view of a protective screen of a ventilator housing according to the invention;

FIG. 2a: a section through a first form of execution of the invention, along the line II—II in accordance with FIG. 1;

FIG. 2b: a section through a second form of execution of the invention in a view in accordance with FIG. 2a;

FIG. 3: a lateral view of a fastening stud in accordance with the invention;

FIG. 4: a lateral view of an alternate attachment stud in accordance with the invention;

FIG. 5a: a view in the direction of the arrow V, in accordance with FIG. 3;

FIG. 5b: a view of an alternate form of execution analogous with FIG. 5a; and

Figure 6:
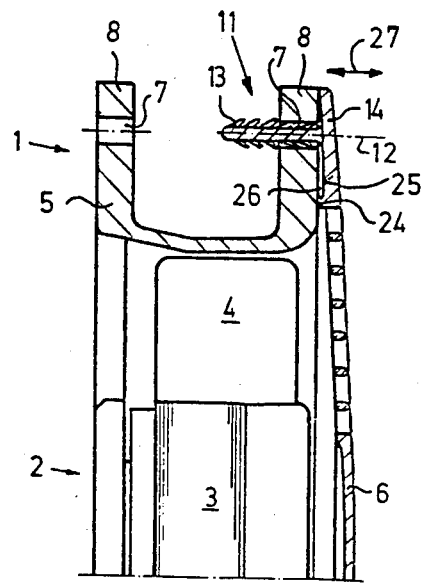

FIG. 6: a section through a ventilator housing in accordance with the invention with an attached protective screen.

In accordance with FIG. 6, a ventilator is positioned in a ventilator housing (1). The example depicted involves an axial ventilator (2) with a motor (3) and ventilator blades (4). The housing (1) has a wall ring (5) on the protective screen (6) for the axial covering of the ventilator (2) which can be attached by means of fastening element which engage in the through-hole borings (7) of housing walls (8). It should be remarked in this connection that, apart from the protective screen (6) depicted in FIG. 6 on the right-hand side, a similar protective screen (6) can likewise be mounted on the left-hand side of the wall ring (5).

In accordance with the invention, the fastening elements are formed as pin-shaped fastening studs (11) which can be inserted into the through-hole borings (7) of the housing walls (8). The studs (11) have on their peripheral surfaces tongue-like springy counter-hooks (13) which are directed in the direction opposed to the direction of insertion of the studs (11), angularly to the longitudinal axis (12) of the stud. At least one of these counter-hooks (13) in accordance with the invention engages the housing wall (8), after the insertion of the studs (11) into the borings (7), under prestressing.

The protective screen (6) depicted in FIG. 1 is quadratically formed, and advantageously has one fastening stud in each of its corner areas (14). The section in FIG. 2a shows a first form of execution in accordance with the invention of studs (11) which are formed in one piece with the protective screen (6). The protective screen (6) advantageously consists, like the studs (11), of plastic.

In FIG. 2b, there is depicted an alternate form of execution in cross-section, in which studs (15) are used which each have a head (16) and a shaft (17), and, with the shaft (17), engage through-hole borings (19) of the protective screen (6). In this, the heads (16) of the studs (15) are advantageously formed as countersinks, and the through-hole borrings (19) of the protective screen (6) are formed with corresponding counter-sinkings (21). The studs (15) also advantageously consist of plastic.

From the depiction of the stud (15) in accordance with FIGS. 3 to 5, which apply analogously for the stud (11) according to FIG. 2a, it is clear that the counter-hooks (13) are positioned in rows running parallel to the longitudinal axis (12) of the studs. It is advantageous in this if the counter-hooks (13) each overlap in rows with one another, like roof tiles. It is within the framework of the invention to either provide, in accordance with FIGS. 3 and 5a, two rows of counter-hook (13) lying diametrically opposite one another, or, in accordance with FIG. 4, rows of counter-hooks (13) positioned so as to be displaced about 90° from one another. Furthermore, only one row or three rows of counter-hooks (13) can also be present. In the example of execution in accordance with FIG. 3, with two rows lying diametrically opposite one another, it is advantageous if the studs (11, 15) have centering attachments (22) in the areas of their peripheral surface which lie between the rows of counter-hooks (13) (FIG. 5d), which contribute to a good, centering seating of the studs (11, 15) in the borings (7).

It is furthermore proposed, in accordance with the invention, that the counter-hooks (13) are each positioned in two diametrically opposed rows of such a type in the direction of the stud's longitudinal axis (12) displaced to one another in such a way that a counter-hook (13) and a gap lie diametrically opposed between two counter-hooks (13), which is clear through the line (23) in FIG. 4. Through this it is attained that, considered from the direction of the stud's longitudinal axis (12), at least one counter-hook (13) of another row is positioned between two counter-hooks (13) of one row, so that the distance, measured by the stud's longitudinal axis, of two counter-hooks (13) engaging one another during the insertion of the stud (11, 15) into the boring (7) of the wall (8) is reduced. This contributes to a secure engagement, even with differing strengths of the housing walls (8) and/or the protective screen (6).

To further improve the mounting of the protective screen (6), and to increase the prestressing between the protective screen (6) and the wall ring (5), it is provided in accordance with the invention (see FIGS. 2a, 2b, and 6) that the protective screen (6) has, on each one of its inner sides which are turned to the housing (1), each preferably a ring-shaped supporting edge (24), and that the inner sides of the protective screen (6) in the corner areas (14) which have the studs (11, 15), each have a surface (25), which stands out, relative to the supporting edge (24) in a direction opposed to the housing (1), preferably running at a slight angle to the plane of the supporting edge (24). Through this, an aperture (26) arises in the corner areas (14) between the protective screen (6) and the wall ring (5), so that the corner areas (14) can move springily in the direction of the double arrow (27) in FIG. 6. The studs (11, 15) are inserted into the borings (7) as deep for assembly as the aperture (26) allows. The corner areas (14) spring elastically back, so that it is ensured that at least one counter-hook (13) comes to fit under prestressing on the housing wall (8).

On the basis of the engaged counter-hooks (13), the protective screen (6) is advantageously attached to the housing (1) in a non-loosenable manner, that is, the loosening of the protective screen (6) is only possible by destroying the counter-hooks (13).

The invention is not limited to the depicted examples of execution, but also comprises all means which create the same effect in the concept of the invention.

What is claimed is:

1. A ventilator housing provided with at least one protective screen for covering a ventilator positioned in said housing, with through-hole borings being provided in walls of said housing for fastening said protective screen by means of fastening elements, comprising:
   said fastening elements being pin-shaped fastening studs for inserting into said through-hole borings of said housing walls;
   peripheral surfaces of said studs including tongue-like springy counter-hooks oriented in a direction opposite to insertion direction of said studs;
   said counter-hooks being angularly disposed to longitudinal axis of each associated one of said studs;
   at least one of said counter-hooks on each of said studs engaging behind said housing wall after insertion of said studs into said through-hole borings; and
   means provided on said protective screen for prestressing said studs so that said protective screen is fastened to said housing in a non-looseable arrangement to avoid vibrations thereof;
   said means including a supporting edge provided on an inner side of said protective screen facing said housing for engagement with said housing walls to provide a spacing between said housing walls and said inner side of said protective screen in areas of said studs prior to said studs being prestressed; and
   said screen area being springily moved against said housing walls by said studs so that said screen areas tend to spring elastically back when said one of said counter-hooks on each of said studs is engaged behind said housing walls to thereby provide said prestressing of said studs.

2. A ventilator housing in accordance with claim 1, wherein said supporting edge on said inner side of said protective screen is annular.

3. A ventilator housing in accordance with claim 1, wherein said screen areas are corner areas of said protective screen.

4. A ventilator housing in accordance with claim 3, wherein each of said corner areas is at a slight angle to a plane of said supporting edge on said inner side of said protective screen.

5. A ventilator housing in accordance with claim 1, wherein said studs provide a single piece construction with said protective screen.

6. A ventilator housing in accordance with claim 1, wherein said studs each have a head and a shaft, each head being engaged in a through-hole boring provided in said protective screen with each shaft extending out from said screen boring respectively.

7. A ventilator housing in accordance with claim 6, wherein said heads of said studs are constructed as counter-sinks, and said through-hole borings of said protective screen are provided with corresponding counter-sinkings.

8. A ventilator housing in accordance with claim 1, wherein said counter-hooks of each stud are positioned in at least one row running parallel to said longitudinal axis of each stud.

9. A ventilator housing in accordance with claim 8, wherein said counter-hooks of each stud are positioned in an overlapping arrangement with one another in said row.

10. A ventilator housing in accordance with claim 8, wherein two rows of counter-hooks, which lie diametrically opposed to one another, are provided on each stud.

11. A ventilator housing in accordance with claim 10, wherein each of said studs has centering attachment means in areas of said peripheral surface lying between said two rows of counter-hooks.

12. A ventilator housing in accordance with claim 8, wherein four rows of counter-hooks, which are positionly displaced by 90° to one another, are provided on each stud.

13. A ventilator housing in accordance with claim 10, wherein said counter-hooks of said two diametrically opposing rows on each stud are positioned so that one row is displaced with respect to the other row, in such a manner in the direction of said longitudinal axis, that a counter-hook of one row and a gap between two counter hooks of the other row lie diametrically opposed to one another.

14. A ventilator housing in accordance with claim 1, wherein said protective screen has a quadratical construction, said protective screen being provided with one fastening stud in each corner area.

15. A ventilator housing in accordance with claim 1, wherein said fastening studs are plastic.

* * * * *